Sept. 8, 1936.  R. A. WEIDENBACKER  2,053,856
EDGE TYPE OIL FILTER
Filed July 26, 1935
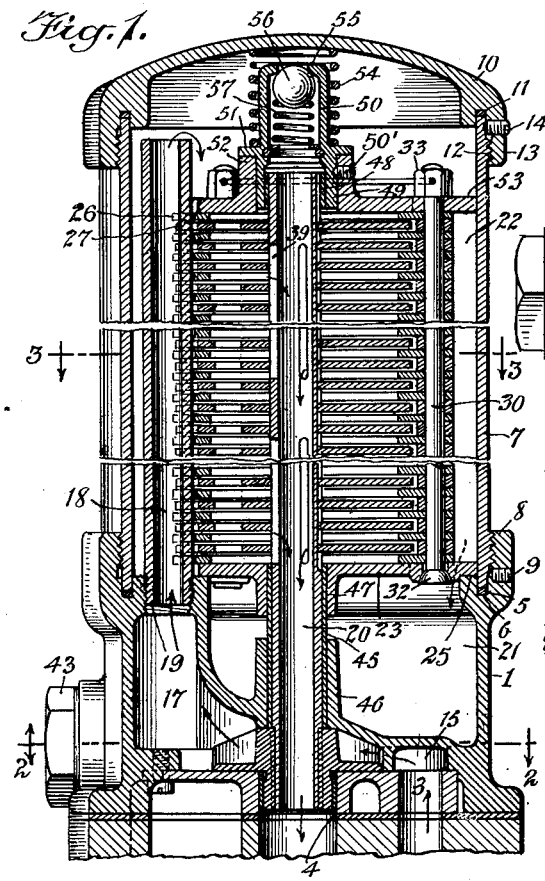
WITNESSES
Geo. W. Naylor
A. L. Kitchin.
INVENTOR
Russell A. Weidenbacker
BY
Munn, Anderson & Liddy
ATTORNEYS Patented Sept. 8, 1936

2,053,856

UNITED STATES PATENT OFFICE 2,053,856

EDGE TYPE OIL FILTER

Russell A. Weidenbacker, Haverford, Pa.

Application July 26, 1935, Serial No. 33,380

8 Claims. (Cl. 210—167)

This invention relates to oil filters and particularly to an improved construction capable of use in various places and especially for filtering oil used in lubricating internal combustion engines, an object being to provide a strong, sturdy filter which will not readily get out of order and which will continuously function for a long period of time without adjustment.

Another object of the invention is to provide an oil filter which will permit a full flow of oil at all times.

An additional object of the invention is to provide an oil filter for internal combustion engines or other machines wherein the oil is pumped into the filter, cleaned, and then forced from the filter, the structure being such that if the volume of oil is within the capacity of the filter it will all be cleaned, but if it is greater than the capacity of the filter it will nevertheless flow through the filter and be cleaned in proportion to the volume capable of being taken care of by the filtering parts.

An additional object, more specifically, is to provide a filter having a plurality of rotating rings or disks coacting with a plurality of stationary rings or disks for filtering the oil, the rotating rings substantially floating in the oil during the filtering operation.

An additional object of the invention is to provide an oil filter wherein the oil continuously flows through the filter, the oil acting as a power member for causing certain parts of the filter to function during the filtering action.

In the accompanying drawing—

Figure 1 is a vertical sectional view through a filter disclosing an embodiment of the invention, the section being taken approximately on the line 1—1 of Fig. 2;

Fig. 2 is a transverse sectional view through Fig. 1 on the line 2—2;

Fig. 3 is a transverse sectional view through Fig. 1 approximately on the line 3—3;

Fig. 4 is a fragmentary sectional view through Fig. 3 on the line 4—4;

Fig. 5 is an enlarged fragmentary sectional view through Fig. 3 on the line 5—5;

Fig. 6 is a view similar to Fig. 5 but showing a modified form of stator rings;

Fig. 7 is a view similar to Fig. 6 but showing both the stator and rotor rings as being round in cross section.

Referring to the accompanying drawing by numerals, 1 indicates the lower casing of the filter which may be secured to an engine or other device by suitable bolts 2 so that oil may flow through the passageway 3 into the filter and through the passageway 4 from the filter. The lower section of the base 1 is provided with an annular groove 5 in which is arranged a gasket 6, said groove accommodating the lower edge of a drum 7. The upper edge portion of the base 1 is provided with an internally threaded flange 8 into which the drum 7 is screwed and is locked against unscrewing by a suitable set screw 9. The upper part of the filter is formed substantially in the same manner, namely, with a top 10 having a groove 11 for receiving the upper edge portion of the drum 7, while a threaded portion 12 is screwed into a threaded flange 13 and locked in place by a set screw 14.

As indicated particularly in Fig. 1, oil from the oil pump of an internal combustion engine flows through the passageway into a chamber 15 and into contact with a turbine 16 arranged in a chamber 15'. From the chamber 15' the oil flows into a chamber 17 and from the chamber 17 through a pipe 18 into the upper part of the filter. The pipe 18 is screwed into a suitable internally threaded bore 19 which is part of the base 1. After the oil flows through the pipe 18 it completely fills the interior of the drum 7 and associated parts and after passing through the filtering members hereinafter fully described it flows through an outlet pipe 20, through the passageway 4 to the point of utilization. The oil pump will maintain this flow and will also maintain the pressure of oil within the filter so that there will be a continuous flow. This pressure may vary widely according to the action of the pump, but the filter is designed as shown in the accompanying drawing to accommodate oil at forty or fifty pounds or even greater pressure.

The base 1 is provided with a sludge chamber 21, so that dirt, grit and other foreign substances in the oil in the space or chamber 22 of drum 7 will either remain in this space or gradually drop by gravity into the sludge chamber 21. The finer particles of grit and the like usually remain in suspension when the filter is being used but when the circulation of oil stops this grit and the like will gradually fall by gravity into the sludge chamber 21.

It will be noted that there is provided a plate 23 in the form of a spider, as illustrated in Figs. 3 and 4. The central portion is solid while the outer part is formed with three arms 24 which rest on the inner flange 25 of the base 1. Above the plate 23 the various filtering elements are mounted, the same consisting principally of stator elements 26 and rotor elements 27. These stator and rotor elements may be solid disks but they are preferably formed as shown in Fig. 3. For instance, the stator elements 26 are formed as rings 28 having ears 29 overlying the arms 24, so that the various clamping bolts 30 may be used to clamp the parts together. As illustrated in Fig. 1, the lower end of these clamping bolts have rounded heads 32, thus providing a bearing element when the clamping nuts 33 are tightened. For instance, as shown in Fig. 1, the lowermost stator 26 is resting directly on plate 23. Immediately above this stator there is arranged a rotor or rotary element 27, which, as shown in Fig. 3, consists of a ring structure 34 having a number of spokes 35 and a hub 36. The hub 36 is provided with three inwardly extending lugs 37, but a greater or less number may be used without departing from the spirit of the invention. These lugs fit loosely in the respective grooves 38 of the pipe 20. It will be noted that the pipe 20 is also provided with a number of elongated openings 39 permitting the oil to flow freely from the filtering elements. The rings 34 of the rotor elements and the rings 28 of the stator elements in all instances are positioned to have spaces therebetween, as, for instance, the spaces 40, 41 and 42. These spaces may be 1/1000 or 1/10000 of an inch, and, consequently, will permit the oil to flow inwardly toward the pipe 20, but will prevent the entrance of dirt, grit and the like. At the outer edge of the periphery of the rotor 27, there will be a separation of the oil, grit, and the like, and the oil will flow inwardly under pressure, while the grit will remain in suspension in the oil or drop downwardly into the sludge chamber 21, from which it may readily be removed at any time by removing the plug 43. The spaces 40, 41, and 42 just described are accurately formed by spacing members 44, which may be specially prepared rings which slide over the clamping bolts 30, or may be formed of wires bent into ring form and placed in position; also any other form of spacers which will accurately space the stators will be satisfactory.

It will be observed that the space between the various stators is such as to accommodate the various rotors, and, at the same time, allow a small space on each side of each rotor whereby the rotors will, in a certain sense, float between the stators and be rotated by reason of the loose connection of the lugs 37 fitting into the grooves 38 as shown in Fig. 3. The rotors will rotate at various speeds according to the speed of flow of the oil. This is caused by the turbine 16 being rigidly secured to the tube 20 and rotated thereby. As the tube 20 rotates it will in turn rotate all of the rotors. As shown in Fig. 1, the tube 20 is rotatably mounted in a sleeve 45 which acts as a bearing therefor at the lower end, said sleeve being carried by a tubular boss 46 and also a tubular boss 47. At the upper end the tube 20 is rotatably mounted in a sleeve 48 fitting into a tubular extension 49 of a valve casing 50. A set screw 51' locks the casing 50 against accidental rotation. This casing has a flange 51 resting on the tubular boss 52 of a top plate 53. It will be understood that after the parts have all been properly assembled, the various nuts 33 are tightened so as to tightly clamp all the stators and all the spacing rings 40 together. These members never move but are firmly held in a fixed position. The flange 51 of casing 50 accommodates one end of a spring 54 while the opposite end presses against the cap 10, whereby this casing and all of the filtering elements including the plate 23 are held down so as to press continually against the flange. The casing 50 is provided with a restrictive opening 55 into which projects part of a ball valve 56, said ball valve being actuated by a spring 57. By varying the tension of the spring 57 there will be a greater or less resistance to the movement of the ball valve 56 downward. For instance, if the volume of oil passing through the filter is well within the capacity of the filter and the pressure of oil is about forty pounds per inch, the spring should be such as to prevent the ball valve 56 from opening at forty or forty-one pounds, so that all the oil will be compelled to pass through the filtering elements. However, under these circumstances, if the pressure of the oil should increase above the point set, as for instance forty-one pounds, the ball valve 56 will move away from its seat and allow the oil to flow directly into pipe 20, whereby it will be impossible to break the filter through excessive pressure.

Instead of using the flat rotors and stators as shown in Figs. 3 and 5, the arrangement could be as illustrated in Fig. 6, wherein the rotors 27' are the same as shown in Fig. 5 while the stators 26' are formed from round material welded or otherwise secured to rings 58 which are round in cross section. The same spacing, however, is provided and separation of the oil and grip will occur at the periphery of the rotors.

In Fig. 7 a further modified form of the invention is shown wherein the stators 26' are round instead of flat in cross section and the rotors 27' are round in cross section. It will thus be seen that the particular shape of these members may be varied without changing the result. In all instances, however, they are accurately positioned so that the rotors will float between the stators and the spaces between the rotors and stators will be very small whereby oil may be forced therethrough under pressure but grit and other foreign matter cannot pass but will stay suspended in the oil exterior of the filtering members or drop down into the sludge chamber 21.

After the parts have been assembled as illustrated in Fig. 1, the filter is ready for operation. When the pump is started oil will flow past the turbine 16 for rotating this member, which, in turn will rotate the tube 20 and all the rotors. As the oil continues to flow into the filter it will fill up chamber 17 to the upper part of the chamber or space 22 which it will eventually fill, and after the chamber 22 has been filled the continuous flow of oil will cause some of the same to pass radially inwardly between the various rotors and stators and this oil will flow through the openings 39 into the interior of the tube 20 from which it is discharged out through the passageway 4 so as to flow to the point of utilization. This action is continued during the use of the filter except when the pressure is excessive and when this occurs the ball valve 56 will move away from its seat and allow some of the oil to pass directly into the tube 20. In this way there will always be a free flow of oil to the bearings or other points of utilization.

Whenever the pump stops the flow of oil naturally stops and any grit or other matter in suspension in the oil in the space or chamber 22 will gradually move under the action of gravity downwardly into the sludge chamber 21, thus leaving the oil clear or in a settled condition. When the filter starts again the movement of the rotors will not stir up the sludge as such sludge is below all these members.

In constructing the rotors, the spacing rings 44 and 58 and the like, any desired material may be used but preferably material that will not swell or be affected by the oil. If desired all the parts may be made of metal or some made of metal and others of a composition of different metals, or fibers. While openings 39 have been provided in the upper and lower parts of tube 20, this is not always necessary because the oil could flow downwardly through the various rotors to the lower opening, if only a lower opening were used. This could be done when the rotors are provided with spokes 35 as shown in Fig. 3, but where the rotors are made of solid disks, the various openings 39 would have to be overlapped in such a way as to provide openings from the highest rotor to the lowest rotor.

I claim:

1. An oil filter including a casing having means forming an inlet passageway extending from near one end to near the opposite end, a rotatable outlet pipe extending from near said opposite end to a discharge point, said opposite end being normally closed, said outlet pipe having openings intermediate its length, means actuated by the flow of oil through the filter for constantly rotating said outlet pipe and a plurality of filtering members arranged along said outlet pipe some of said filtering members being stationary and the others being connected with said outlet pipe so as to rotate therewith, the stationary members and the rotatable members being alternately arranged.

2. A full-flow oil filter including means forming an inlet passageway extending from one end of the device to the other, a casing surrounding said means, an outlet pipe extending longitudinally of the casing centrally thereof, said outlet pipe having a plurality of openings therein, means actuated by the oil for rotating said outlet pipe, and a plurality of filtering members arranged along said outlet pipe, half of said filtering members being stationary in respect to said casing and the other half rotary, said rotary filtering members being keyed to said outlet pipe to be rotated therewith, the keyed structure being such that the rotary filtering members may freely move longitudinally of said outlet pipe, said rotating filtering members and said stationary members being alternately arranged, the rotating members being spaced from the stationary members by a film of oil when the filter is in use, and thereby floating in the oil forced toward said outlet pipe.

3. An oil filter, comprising a base having an inlet chamber, a sludge chamber, and a return oil passageway, a casing mounted on said base and in free communication with said sludge chamber, a pipe extending from said inlet chamber upwardly to near the top of said casing, whereby oil fed into said inlet chamber must pass upwardly and out the top of said pipe, an outlet pipe extending from near the upper end of the casing downwardly through the outlet pipe to said base, means connected with said outlet pipe operated by the oil passing into the inlet chamber for rotating the outlet pipe, an inwardly opening valve arranged adjacent the upper end of the outlet pipe acting to remove any excess pressure in said casing, a plurality of stationary filtering members arranged between the ends of said outlet pipe, a plurality of filtering members floating in the oil between said stationary members, said floating members being keyed to said outlet pipe and rotated thereby, the keyed connection being such as to permit said filter members to freely move longitudinally of said outlet pipe, and an opening in said outlet pipe for permitting the oil to pass from said filtering members into the outlet pipe, grit, sludge and the like in the oil acting to drop downwardly in said casing and settle into said sludge chamber.

4. An oil filter including a casing, means providing an inlet passageway, means providing an outlet passageway, a turbine arranged in the inlet passageway and connected with the means forming the outlet passageway for rotating said last-mentioned means, said last-mentioned means being formed as a pipe with openings intermediate its length, top and bottom plates surrounding said pipe, a plurality of stationary filtering members arranged between said plates and accurately spaced apart, a plurality of rotating filtering members arranged between the stationary filtering members with the space between the upper and lower surfaces of the rotating members and the respective adjacent stationary members being such that oil may pass under pressure but grit and other sludge cannot pass, said rotating members being movable longitudinally of said outlet pipe and keyed thereto so as to be rotated thereby.

5. An oil filter including a plurality of stationary filtering members formed as flat rings, accurately formed spacing rings arranged between each stationary filtering member, a clamping structure for clamping the stationary members and spacing rings together, a rotating filtering element arranged between each two stationary filtering members, each of said rotating filtering elements being formed as a flat ring with inwardly extending spokes and a centrally arranged hub, said hub having a projection, an outlet pipe having a groove sufficiently large to receive said projection, said outlet pipe also having oil passageways, means actuated by oil flowing through the filter for rotating said outlet pipe continuously during the operation of the filter whereby said rotating filtering elements will be rotated, and means for directing oil to said filtering elements.

6. In an oil filter, a filtering structure including a plurality of stationary rings having a number of projections, clamping rings extending between said projections for clamping said rings together, accurately formed spacers arranged between the respective rings for accurately spacing said rings apart, and a rotatable filtering member, freely movable in a direction parallel to its axis arranged between the respective stationary rings, said filtering member comprising a ring having inwardly extending spokes merging into a central hub, said filtering member being of a thickness to leave a slight space between each face of the same and the respective adjacent stationary rings so that oil forced from the periphery inwardly will flow on both sides of the rotatable filtering member, while grit and other foreign matter will be prevented from moving between the respective filtering members, a rotatable outlet pipe for the filtered oil, and means keying the rotatable filtering members to the outlet pipe.

7. A filter of the character described including a base closed at the bottom except for an inlet opening and an outlet opening, said base having a sludge chamber, an inlet chamber, and a centrally positioned passageway, a casing mounted on one end of said base and in free communication with the sludge chamber thereof, a cap mounted on top of said casing so that the casing will be oil-tight, a pipe extending from the inlet chamber upwardly through the casing to near the top thereof, whereby oil entering through said inlet will pass into said inlet chamber and pipe to the upper part of said casing so as to fill the casing with oil, an outlet pipe extending from near the upper part of said casing downwardly through said passageway in the base to an outlet opening in the base, a turbine arranged in said inlet chamber and connected to said pipe so that the oil flowing into the inlet chamber will rotate said pipe, said pipe having intermediate its length above the base an oil passageway, a plate carried by said base and surrounding said outlet pipe, a second plate arranged near the upper end of said casing and surrounding said pipe, and a spring-pressed valve carried by said second plate, said valve being adapted to provide communication between the interior of said casing and the interior of said outlet pipe so as to relieve excessive oil pressure and cause the oil to flow directly out through the outlet pipe, and a plurality of filtering members arranged between said plates, certain of said filtering members being stationary and spaced apart and others being movable and floatable in the oil forced from the periphery to the outlet pipe, said floatable filtering being freely movable longitudinally of said outlet pipe and keyed thereto so as to be rotated thereby.

8. An oil filter comprising a casing provided with an inlet and having an oil filtering chamber, an apertured tubular outlet member extending for substantially the full length of said filtering chamber and to a discharge point, a motor connected with said outlet member actuated by the oil flowing through said inlet for rotating said outlet member, a plurality of stationary spaced filtering plates surrounding said outlet member and a plurality of rotatable filtering plates surrounding said outlet member and connected therewith so as to be rotated constantly thereby during the time the filter is in use, said stationary plates and said rotatable plates being alternately arranged.

RUSSELL A. WEIDENBACKER.